Nov. 24, 1959     S. P. CRANE     2,914,168
MOUNT FOR BICYCLE SADDLE COVER
Filed Aug. 9, 1957
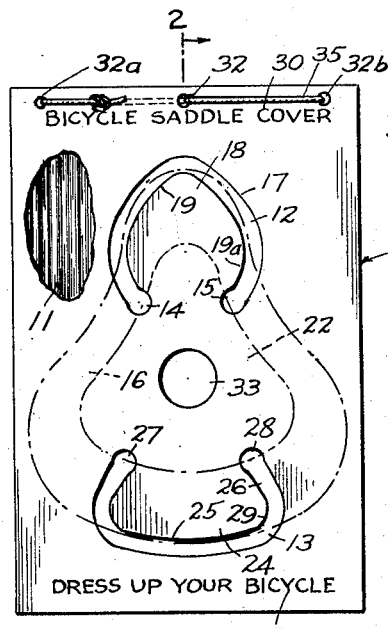
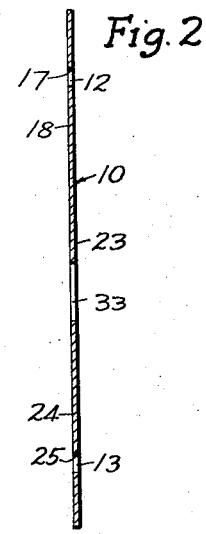
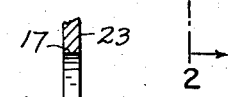
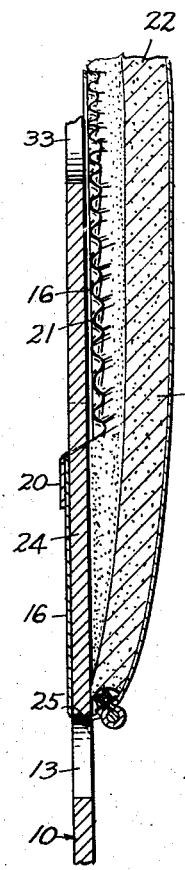
INVENTOR.
Samuel P. Crane
BY
ATTORNEY

United States Patent Office 2,914,168
Patented Nov. 24, 1959

2,914,168

MOUNT FOR BICYCLE SADDLE COVER

Samuel P. Crane, Great Neck, N.Y., assignor to R. O. Kent Co., New York, N. Y., a copartnership Application August 9, 1957, Serial No. 677,382

6 Claims. (Cl. 206—79)

This invention relates to merchandise display mounts and particularly to the mounts for flexible plastic saddle covers for bicycles.

Such covers consist of a seat portion formed of a flexible plastic sheet in the outline of the bicycle saddle, the seat portion being secured by a welted seam to a short skirt. The unsecured edge of the skirt is shirred or gathered and the gathered edge is stitched to a stretched elastic band which tends to contract the skirt circumferentially and to pull it into substantial parallelism to the seat portion. A soft and relatively thick padding of foam rubber or the like is arranged between the seat portion and the skirt.

In order to prevent damage or distortion of such covers during handling, shipment, storage and display, it has been customary to stiffen and stretch them into shape by inserting thereinto a stiffening sheet of paper board. The sheet has been of about the same size and shape in outline as that of the seat portion of the cover. To insert the sheet inside of the skirt and against the padding, it has been necessary heretofore to heat the plastic cover so that the skirt and seat portion may be readily manipulated and properly stretched and shaped around the stiffening sheet. However, the heating and inserting operation takes an appreciable amount of time and labor and increases the cost of production of the cover to a considerable extent.

The present invention therefore contemplates the provision of a mount for the skirted saddle cover which eliminates the heating operation and not only permits the easy and rapid mounting of the cover on the mount in an inexpensive and efficient manner, but insures that the shape of the cover is adequately maintained, ample space provided for printed advertising matter and the cover displayed to the best advantage for inspection and other purposes.

In the drawings,

Fig. 1 is an elevational view of the mount, partly broken away to show the interior corrugations, and showing the saddle cover in the mounted position thereof by means of dash-dot lines.

Fig. 2 is a vertical sectional view thereof taken on the line 2—2 of Fig. 1.

Fig. 3 is a top plan view thereof showing the longitudinal corrugations of the mount.

Fig. 4 is a fragmentary vertical sectional view of the upper part of the cover and the mount showing the front or narrow portion of the cover skirt passed through the upper slot of the mount and stretched by the upper tongue.

Fig. 5 is a similar view of the lower part of the cover and the mount showing the rear or wide portion of the cover passed through the lower slot of the mount and stretched by the lower tongue.

In the illustrated embodiment of the invention, the mount 10 is preferably made of a sheet of corrugated paper board with the corrugations or ribs 11 extending longitudinally of the mount or vertically as viewed in Fig. 1 from one end of the sheet to the other end. Two vertically spaced apart and approximately U-shaped slots 12 and 13 are made in the sheet, the slots each being of a substantially uniform width of at least three times the thickness of the sheet to permit the easy passage therethrough of the top part of the skirt 16.

The upper slot 12 is generally heart shaped or of inverted U-shape and is symmetrical about the vertical center line of the sheet. Each of the lowermost ends 14 and 15 of the slot 12 is preferably of slightly greater diameter than the width of the slot and of generally circular shape to round the slot end and to provide sufficient clearance for the cover skirt 16 to pass readily through the sheet from one face to the other face without excessive strain or stretching thereof.

The inner ends 14 and 15 of the slot 12 are spaced apart transversely a distance somewhat less than the greatest width of the outer edge 17 of the slot, which greatest width occurs along a transverse line intermediate the upper and lower ends of the slot. Said slot forms an upper tongue 18 between the inner edges of the slot, the tongue having a free upper end and being integral with the sheet at its lower end and thereby being resistant to bending out of the plane of the sheet. The upper end part of said tongue is of the same general shape as that of the narrow end of the saddle cover and has inwardly converging side edges 19. The lower parts 19a of the side edges of the tongue converge downwardly or toward the center of the sheet. The upper part of the tongue 18 fits into the interior of and is covered by the skirt as best seen in Figs. 1 and 4 without excessive stretching of the skirt, the elastic band 20 on the gathered edge portion 21 of the skirt contracting said edge portion about the tongue and thereby holding the narrow end part of the saddle cover against accidental dislocation on the mount.

The skirt passes through the lower part of the upper slot 12 from the front to the rear surface of the mount. The middle portion 22 of the cover rests against the rear face 23 of the mount while the lower portion of the skirt is engaged and stretched by the lower tongue 24 formed by and inside of the lower slot 13.

The edge 25 at the bottom of the lower tongue is shaped to fit the rear or wide edge of the saddle cover and to enter the skirt to a point quite close to said rear edge. The side edges 26 of said tongue converge upwardly or toward the center of the mount and terminate at the circular slot ends 27, 28 which are similar to the ends 14, 15 of the upper slot. A suitable curved edge portion 29 joins each side edge 26 with the end edge 25 of the lower tongue. When the tongue is inserted into the interior of the skirt, the lower portion of the skirt passes through the sides of the lower slot 13 from the front to the rear face of the mount and covers the lower end edge of the tongue 24 in much the same manner as hereinbefore described in connection with the tongue 18 for the upper part of the skirt. Since the distance between the uppermost end of the tongue 18 and the lowermost part of the tongue 24 is substantially that or slightly greater than that of the overall length of the seat portion or of the skirt of the cover, and since the longitudinal reinforcing corrugations resist bending of the tongues out of the plane of the sheet, it will be understood that the insertion of the opposed tongues into the skirt at opposite points stretches the cover longitudinally to the desired substantially flat state and that little or no transverse stretching is therefore required.

It will further be understood that the slots are made sufficiently wide, or in other words, sufficient material is removed from the sheet in forming the slots, to permit the skirt to be drawn with ease and with room to spare past the top and bottom edges respectively of the respective tongues to make possible rapid and inexpensive assembly. Since the mount extends a substantial distance past the upper and lower ends of the slots and past the sides of the slots, ample space is provided on the sheet for the printing or impression of advertising matter 30, 31. Sufficient space is also provided for the holes 32, 32a and 32b near the top of the sheet, through which a suitable string may be passed, the string as 35 being also passed through the similar holes of the mounts in a packaged stack of such mounts, whereby pulling on the exposed end of the string separates the mounts in the stack and suspends them on the string for quick and easy display. A central viewing opening 33 between the slots permits easy inspection of the padding layer 34 of the cover without weakening the tongues.

It will now be seen that not only is the insertion of the tongues into the skirt ends rapidly and easily accomplished without the need for heating the cover, but also that the cover is adequately held against displacement relatively to the mount and is properly stretched and shaped thereby while complete inspection of the cover is afforded and an attractive display provided.

While a certain specific form of the invention has herein been shown and described, various obvious changes may be made therein without departing from the spirit of the invention defined by the appended claims.

I claim:

1. The combination with a bicycle saddle cover having a seat portion and a gathered skirt portion drawn together by an elastic band secured to the edge of the skirt portion in stretched condition, of a mount for the cover comprising a sheet of corrugated board having a pair of longitudinally spaced apart opposed tongues formed therein, each tongue being partly separated from the sheet by an approximately U-shaped slot of substantial width, parts of the skirt portion passing from one face of the sheet through the slots and around the periphery of each tongue to the opposite face of the sheet, and the remainder of the skirt portion and the cover being arranged at said one face and held by the tongues against movement relatively to the sheet.

2. The combination of claim 1, the slots in the sheet being symmetrical about the longitudinal center line of the slots, the distance between the outermost ends of the tongues being slightly greater than the overall distance between the corresponding ends of the skirt portion, whereby the cover is stretched when mounted on the tongues.

3. In combination, a bicycle saddle cover having a seat portion and a skirt portion, means securing said portions together, and means for gathering the skirt portion, and a mount for the cover comprising a sheet of corrugated board having a pair of longitudinally spaced apart and generally U-shaped opposed slots through and arranged symmetrically about the longitudinal center line of the sheet, each end of each slot being in transverse spaced relation to said center line and being at that part of the slot nearest the other slot, the slots being of substantial width sufficient to permit the easy passage of the skirt portion of the cover through the slot from one face of the sheet to the other face, the material of the sheet within one slot forming a first tongue resistant to bending and entering one end part of said skirt portion, the material of the sheet within the other slot forming a second tongue wider than the first mentioned tongue and similarly entering the opposite end part of the skirt portion, each of the slots being in substantial spaced relation to the adjacent end of the sheet and to the sides of the sheet to provide spaces on the sheet around the slots adapted to have advertising matter impressed thereon.

4. In combination, a bicycle saddle cover having a skirt portion and means for holding said portion in a gathered position and for releasing said portion to permit the expansion thereof, and a mount for the cover comprising a sheet provided with a pair of tongues extending within the periphery of the sheet and in opposite directions, each tongue being separated from the sheet around the sides and one end thereof and being integral with the sheet at the other end, each tongue entering and being self maintained within the interior of the skirt portion of the cover and having the end part thereof embraced and covered by the adjacent part of the cover.

5. The combination with a saddle cover having a seat portion, a skirt portion, and means for holding the skirt portion in a gathered position, the peripheral edge part of the skirt portion being constricted by said means to an effective circumferential length less than the initial length thereof, of a mount comprising a sheet of corrugated board provided with a pair of tongues extending within the periphery of the sheet and in opposite directions, each tongue being separated from the sheet around the sides and one end thereof and being integral with the sheet at the other end, each tongue entering and being self maintained within the interior of the gathered skirt portion, the distance between the outermost ends of the tongues being approximately that of the overall distance between the opposite ends of the skirt portion as measured along the longitudinal center line of the skirt portion, the tongues being resistant to the bending thereof out of the plane of the sheet and being in longitudinal alignment with each other.

6. The combination with a bicycle saddle cover having a seat portion, a gathered skirt portion behind the seat portion, and means for gathering the skirt portion and maintaining the skirt portion gathered, of a mount for the cover comprising a sheet having a pair of longitudinally spaced apart opposed tongues formed therein, one of the tongues being wider than the other and entering the interior of, and abutting against the adjacent end of the skirt portion and embraced by the adjacent end portion of the cover, the other tongue entering the interior of, abutting against, and being embraced by the other end portion of the cover, each tongue being partly separated from the sheet by a slot of substantial width, parts of the skirt portion passing from one face of the sheet through the slots and around the periphery of each tongue to the opposite face of the sheet, and the remainder of the skirt portion being arranged and maintained at said one face by said means and held under tension by the tongues against movement relatively to the sheet.

References Cited in the file of this patent

UNITED STATES PATENTS

| 376,997 | Voorhis | Jan. 24, 1888 |
| 570,408 | Jones | Oct. 27, 1896 |
| 2,012,131 | Kondolf | Aug. 20, 1935 |

FOREIGN PATENTS

| 313,221 | Germany | July 5, 1919 |
| 1,111,366 | France | Oct. 26, 1955 |